US012782534B2

(12) United States Patent
Schmidt et al.

(10) Patent No.: US 12,782,534 B2
(45) Date of Patent: Nov. 3, 2026

(54) METHOD AND APPARATUS FOR THE FUSION OF CLASSIFICATION RESULTS OF A PLURALITY OF CLASSIFICATION MODELS FOR OBJECT IDENTIFICATION BY MEANS OF ULTRASOUND-BASED SENSOR SYSTEMS IN MOBILE DEVICES

(71) Applicant: Robert Bosch GmbH, Stuttgart (DE)

(72) Inventors: Juergen Schmidt, Sindelfingen (DE); Lena Bendfeld, Stuttgart (DE); Michael Tchorzewski, Boeblingen (DE); Tobias Wingert, Leonberg (DE); Tom Reimann, Bissingen An der Teck (DE)

(73) Assignee: ROBERT BOSCH GMBH, Stuttgart (DE)

( * ) Notice: Subject to any disclaimer, the term of this patent is extended or adjusted under 35 U.S.C. 154(b) by 154 days.

(21) Appl. No.: 18/832,540

(22) PCT Filed: Feb. 6, 2023

(86) PCT No.: PCT/EP2023/052817

§ 371 (c)(1),
(2) Date: Jul. 24, 2024

(87) PCT Pub. No.: WO2023/156234

PCT Pub. Date: Aug. 24, 2023

(65) Prior Publication Data

US 2025/0102653 A1 Mar. 27, 2025

(30) Foreign Application Priority Data

Feb. 21, 2022 (DE) ..................... 10 2022 201 766.8

(51) Int. Cl.
*G01S 7/539* (2006.01)
*G01S 15/66* (2006.01)
(Continued)

(52) U.S. Cl.
CPC .............. *G01S 7/539* (2013.01); *G01S 15/66* (2013.01); *G01S 15/87* (2013.01); *G01S 15/931* (2013.01)

(58) Field of Classification Search
CPC .......... G01S 7/539; G01S 15/66; G01S 15/87; G01S 15/931; G01S 2015/938
See application file for complete search history.

(56) References Cited

U.S. PATENT DOCUMENTS

| | | | | |
|---|---|---|---|---|
| 2023/0273312 A1* | 8/2023 | Schmidt | G01S 15/89 367/87 |
| 2024/0125926 A1* | 4/2024 | Schmidt | G01S 7/53 |
| 2025/0102653 A1* | 3/2025 | Schmidt | G01S 15/66 |

FOREIGN PATENT DOCUMENTS

| | | | | |
|---|---|---|---|---|
| CN | 111583250 A * | 8/2020 | G06N 3/08 |
| CN | 118742826 A * | 10/2024 | G01S 15/931 |

(Continued)

OTHER PUBLICATIONS

International Search Report for PCT/EP2023/052817, Issued May 2, 2023.

*Primary Examiner* — Daniel Pihulic
(74) *Attorney, Agent, or Firm* — NORTON ROSE FULBRIGHT US LLP

(57) ABSTRACT

A method for fusion of classification results of a plurality of classification models to classify environment objects using ultrasonic sensor devices in a mobile device. The method includes: detecting sensor signals of ultrasonic transducers of the ultrasonic sensor devices; tracking a position of detected environment objects by the ultrasonic sensor devices and classifying an object type of the detected environment objects by one of classification models associated with each of the ultrasonic sensor devices to obtain a classification result; in the event that it is determined that a specific environment object has entered a detection region of (Continued)

one of the ultrasonic sensor devices and was previously located in a detection region of a further of the ultrasonic sensor devices, selecting one of the classification results for the specific environment object depending on a classification quality based on the classification model and depending on the newness of the classification result.

14 Claims, 3 Drawing Sheets

(51) Int. Cl.
*G01S 15/87* (2006.01)
*G01S 15/931* (2020.01)

(56) References Cited

FOREIGN PATENT DOCUMENTS

| | | | | |
|---|---|---|---|---|
| DE | 102011012379 | A1 | 8/2012 | |
| DE | 102017220269 | A1 | 5/2019 | |
| DE | 102019214612 | A1 | 3/2021 | |
| DE | 102022201766 | A1 * | 8/2023 | ........... G01S 15/931 |
| DE | 102022202036 | A1 * | 8/2023 | ............. G01S 7/539 |
| DE | 102022210990 | A1 * | 4/2024 | ............ B60W 40/00 |
| EP | 3021134 | B1 | 6/2020 | |
| EP | 3671272 | A1 * | 6/2020 | ............. G01S 17/87 |
| WO | WO-2023156234 | A1 * | 8/2023 | ........... G01S 15/931 |

* cited by examiner

METHOD AND APPARATUS FOR THE FUSION OF CLASSIFICATION RESULTS OF A PLURALITY OF CLASSIFICATION MODELS FOR OBJECT IDENTIFICATION BY MEANS OF ULTRASOUND-BASED SENSOR SYSTEMS IN MOBILE DEVICES

FIELD

The present invention relates to ultrasonic sensor systems for mobile devices, such as motor vehicles, and in particular to the fusion of classification results of a plurality of ultrasonic sensor devices with regard to collision-relevant environment objects.

BACKGROUND INFORMATION

Vehicles are generally equipped with ultrasonic sensor systems for object detection. These often have a plurality of ultrasonic sensor devices, each having a plurality of ultrasonic transducers for different detection regions in which environment objects are to be detected. Such ultrasonic sensor devices are often arranged on the front and rear bumpers of a vehicle. The ultrasonic sensor devices are usually designed differently and, due to the different arrangement of the individual ultrasonic transducers, have a separate classification model for the detection/identification of environment objects.

Thus, the ultrasonic transducer arrangements of the ultrasonic sensor devices for detecting collision-relevant environment objects are evaluated using different classification models, and these classification models classify the environment objects with regard to their height, so that a distinction can be made as to whether the environment objects can be driven over or not, i.e., whether they are collision-relevant.

This distinction between high and low environment objects is currently handled by rule-based methods, wherein environment objects that only cause a low signal strength of the ultrasonic reception signal are masked out very early in the signal chain. Alternatively, other approaches can evaluate a plurality of sensor parameters or object properties by means of heuristic approaches and empirical values.

SUMMARY

According to the present invention, a method for the fusion of classification results of a plurality of classification models for object identification by means of ultrasonic sensor devices in mobile devices and a corresponding apparatus are provided.

Example embodiments of the present invention are disclosed herein.

According to a first aspect of the present invention, a method for the fusion of classification results of a plurality of classification models in order to classify environment objects by means of ultrasonic sensor devices in a mobile device is provided. According to an example embodiment of the present invention, the method comprises the following steps:

- detecting sensor signals of ultrasonic transducers of the ultrasonic sensor devices;
- tracking a position of detected environment objects by the ultrasonic sensor devices and classifying an object type of the detected environment objects by one of classification models associated with each of the ultrasonic sensor devices in order to obtain a particular classification result;
- in the event that it is determined that a specific environment object has entered a detection range of one of the ultrasonic sensor devices and was previously located in a detection region of a further of the ultrasonic sensor devices, selecting one of the classification results for the specific environment object depending on a classification quality based on the classification model and depending on the newness of the classification result.

Using machine learning to create data-based classification models requires collecting training data for different environment objects. This training data is ascertained from signal characteristics of the received ultrasonic signals and assigned to a corresponding object type of the environment object. The object type indicates, among other things, the distinction between environment objects that can be driven over and environment objects that are collision-relevant. Signal characteristics can be aggregated variables from the sensor signals, such as maximum amplitude, time of the maximum amplitude, phase position between two reception signals, as well as further attributes, such as a currently measured amplitude, an extent of the object, a detection rate, a number of average received signal peaks/transmission pulse (multi-reflectivity), a number of ultrasonic transducers that can receive the environment object, a signal stability during the vehicle movement, a quotient of the traveled distance and the measured object distance, a number of found intersection points of echo circuits of adjacent ultrasonic transducers, and the like.

The manifestations of signal characteristics often depend critically on the installation position of the individual ultrasonic transducers of an ultrasonic sensor device. The installation height and the vertical adjustment angle are particularly crucial here. In a vehicle in which ultrasonic sensor devices are arranged on the front and rear bumpers, the ultrasonic transducer arrangements of the ultrasonic sensor devices usually differ from one another considerably due to the different bumper geometries. This means that separately trained classification models are assigned to the ultrasonic sensor devices.

However, the classification quality for each of the ultrasonic sensor devices depends on a variety of influencing factors. In addition to the distance from the environment object to be detected, the detection angle at which the environment object in question is detected by an ultrasonic transducer, the relative speed between the environment object and the mobile device, and the time period during which an ultrasonic sensor device detects a corresponding environment object, the configuration of the ultrasonic transducer arrangement is also crucial for the classification quality. For example, if the ultrasonic transducer is installed very low, the difference in the calculated signal characteristics, which is based, for example, on amplitude or multi-reflectivity, between high and low environment objects is less than if the installation position is higher.

An ultrasonic sensor system on a mobile device, such as a vehicle, can comprise a plurality of ultrasonic devices oriented in different directions. The ultrasonic sensor devices detect the environment of the mobile device in different directions and map detected environment objects. In addition, the detected environment objects are classified with regard to characteristics of the ultrasonic reception signal in order to determine whether the environment object is, for example, an environment object that can be driven over or a collision-relevant environment object.

However, when the mobile device moves, it often happens that a specific environment object is detected successively by different ultrasonic sensor devices, i.e. in a motor vehicle by the ultrasonic sensor devices on the front and rear bumpers, under different conditions. Such cases occur, for example, during turning maneuvers, when driving past the relevant environment object, when driving over low environment objects, and the like.

If a specific environment object is detected by a plurality of ultrasonic sensor devices during a corresponding maneuver of the mobile device, separate classifications are usually made for the environment object. The different ultrasonic transducer arrangements of the ultrasonic sensor devices and the separately trained classification models lead to separate, specific classification results for the relevant environment object by means of evaluations of the classification models. The classification results can therefore also be different, which can be safety-critical, in particular for collision-relevant environment objects.

In addition, the classification models used offer the possibility of evaluating the classification quality of the classification carried out for the environment object in question. The classification quality is based on the classification confidence, which can be specified by the classification model. In particular, in conjunction with the different classification qualities of the classification models, a specific environment object is detected and classified with different classification results and different classification qualities depending on the specific movement situation of the vehicle.

Therefore, to improve the classification accuracy of classification with a plurality of ultrasonic sensor devices, it may be useful to fuse the classification evaluations.

Furthermore, according to an example embodiment of the present invention, the classification models can be data-based, wherein the classification qualities are determined as values of an element of an output vector of the classification models with the highest value.

According to an example embodiment of the present invention, the classification quality can be determined directly by the classification model used as the classification confidence. This can implicitly take into account the detection quality, which is derived from the reliability of the detections of the relevant environment object by the particular classification model; the characteristic quality, which evaluates the quality and availability of individual signal characteristics; and the model quality of the classification model, which evaluates the quality of the classification model in general. Alternatively, the classification quality can also be ascertained from these separately determinable individual qualities.

According to an example embodiment of the present invention, it can be provided that the newness is assigned to a newness quality using an assignment function, which newness quality indicates a higher quality the shorter the time since the acquisition of the underlying sensor data, wherein an overall quality is determined from the classification quality and the newness quality, wherein the classification result is selected depending on the overall qualities of the classification results of the classification models.

In particular, the overall quality sigma_tot of a classification process can be determined by an ultrasonic sensor device as a weighted average with the classification quality sigma_class of the relevant classification model and a newness quality sigma_new resulting from a newness of the last ascertained classification result for the relevant environment object, where:

$$\text{sigma\_tot} = (\text{sigma\_class} * a1 + \text{sigma\_new} * a2)/2$$

$$\text{where sigma\_class, sigma\_new} = 0 \text{ to } 1,$$

where a1 and a2 represent additional predeterminable weighting factors.

Alternatively, depending on the classification model used, if it cannot implicitly provide a classification confidence or if said classification confidence is not trusted, the aforementioned individual qualities, namely the detection quality sigma_det, the characteristic quality sigma_char and the model quality sigma_mod, which relate to the classification model and the relevant environment object, can be determined separately and calculated to form an overall quality sigma_tot, also by means of weighted averaging.

$$\text{sigma\_tot} = (\text{sigma\_det} * a1 + \text{sigma\_char} * a2 + \text{sigma\_mod} * a3 + \text{sigma\_new} * a4)/4$$

where a1 to a4 represent additional predeterminable weighting factors.

According to an example embodiment of the present invention, if a specific environment object is detected and classified by a plurality of ultrasonic sensor devices, the classification result of the classification model that results in the highest overall quality sigma_tot can be used.

According to an example embodiment of the present invention, if the classification quality of the classification model is determined by means of the detection quality and/or the characteristic quality and/or the model quality, the individual qualities can be ascertained as follows:

Furthermore, according to an example embodiment of the present invention, the detection quality can be ascertained as a function of a quotient of the number of correct classifications of the specific environment object and the total number of classifications of the specific environment object.

To determine the detection quality, a quotient of the number of correct classifications and the total number of detections is calculated using predetermined validation data sets. This quotient can be assigned to a corresponding value of the detection quality by means of an assignment function, such as a lookup table.

The number of correct classifications is ascertained by evaluating a predetermined database with labeled data. These form validation data sets that assign sensor signals and/or sensor characteristics generated therefrom of known environment objects to a classification (object property: can be driven over, collision-relevant). These validation data sets are used to check how many object detections recognize the classification result of the actual object property and to ascertain a corresponding probability.

According to an example embodiment of the present invention, the characteristic quality can be determined as a function of the contributions of signal characteristics resulting from the sensor signals for ascertaining the classification result for the classification of the specific environment object and a detection characteristic, in particular a relative position of the specific environment object with respect to the ultrasonic transducer assigned to the signal characteristic.

Thus, the characteristic quality can result from the availability of the signal characteristics used. Said characteristic quality evaluates how the different signal characteristics are available and can contribute to the classification of a specific environment object. Because the quality of signal characteristics often depends on the detection distance and the detection angle and/or on the nature of surfaces (reflectivity), the signal characteristics to be evaluated on which the classification by the relevant classification model is based can be used accordingly to assess the quality of the classification result. For example, the signal characteristic of the amplitude provides a very good differentiation in the near range, while in the far range it has only a low value due to similar vertical detection angles. Furthermore, high and low amplitude values can be a good indicators of object height, while values in the middle range are less meaningful.

According to an example embodiment of the present invention, to determine the overall characteristic quality, each individual signal characteristic to be evaluated and the detection conditions, such as the distance to the object to be classified and the detection angle, are taken into account and a corresponding individual characteristic quality is ascertained by means of a suitable assignment function. Furthermore, the individual characteristic qualities are aggregated with respect to the individual signal characteristics to form an overall characteristic quality, in particular by averaging, in particular with a weighted consideration of the individual characteristic qualities.

Furthermore, according to an example embodiment of the present invention, the model quality of the classification model used can be taken into account. This takes into account the fact that different model qualities can be achieved based on the relevant sensor configuration, which results from the installation situation of the ultrasonic transducers of the relevant ultrasonic sensor device. The model quality is independent of the environmental situation and only determines the quality of a classification based on the configuration (arrangement and geometric orientation) of the ultrasonic transducers of the relevant ultrasonic sensor device.

According to an example embodiment of the present invention, the newness with respect to a specific environment object is determined by the timestamp of the last detection for classifying the relevant environment object. For environment objects detected by a plurality of ultrasonic sensor devices, the relevant timestamp of the last classification of the relevant environment object is translated into a corresponding newness, in particular by means of a suitable assignment function that takes into account the probability that changes in the environment will occur within a certain time window.

It can be provided that the classification result of the classification model is selected whose newness indicates a more recent classification if the corresponding overall quality exceeds a predetermined overall quality threshold.

In an alternative embodiment of the present invention, the decision on the classification result to be used can always be made dependent on the newness quality of the classification result as soon as the corresponding overall quality of the relevant classification model exceeds a predetermined overall quality threshold. As a result, when the mobile device moves, the classification result of the classification model whose overall quality for the relevant environment object exceeds a predetermined threshold is generally trusted until the environment object enters the detection region of another of the ultrasonic sensor devices (and thus has a higher newness) and produces a classification result there.

According to an example embodiment of the present invention, the operation of the mobile device can be controlled or carried out as a function of the ascertained or selected classification result. In particular, movement maneuvers can be planned or warnings can be signaled as a function of the classification result.

According to a further aspect of the present invention, an apparatus is provided for carrying out one of the above methods of the present invention.

BRIEF DESCRIPTION OF THE DRAWINGS

Example embodiments of the present invention are explained in more detail below with reference to the figures.

DETAILED DESCRIPTION OF EXAMPLE EMBODIMENTS

Figure 1:
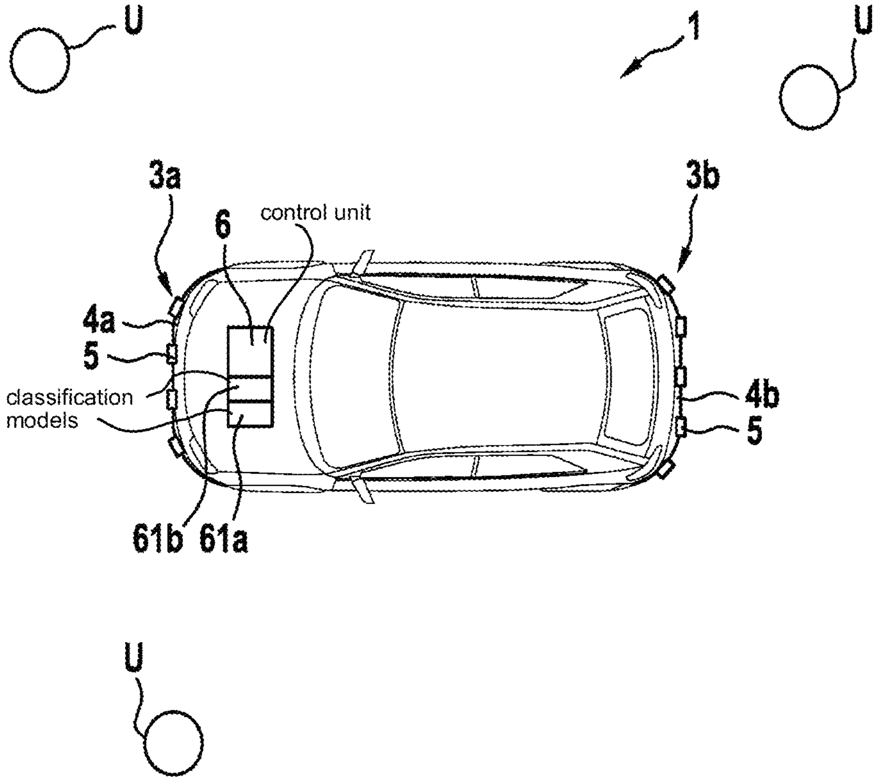
FIG. 1 is a schematic representation of a vehicle with an ultrasonic sensor system with two ultrasonic sensor devices and separate classification models, according to an example embodiment of the present invention.

FIG. 1 shows a schematic representation of a vehicle 1 in a vehicle environment in which one or more environment objects U are located. The vehicle 1 as an example of a mobile device comprises an ultrasonic sensor system 2 with two ultrasonic sensor devices 3*a*, 3*b*, which are arranged on a front bumper 4*a* and a rear bumper 4*b*.

Each of the ultrasonic sensor devices 3*a*, 3*b* comprises a plurality of ultrasonic transducers 5 for emitting an ultrasonic signal with signal pulses and for receiving ultrasonic signals reflected from the environment objects U. The arrangement or orientations of the ultrasonic transducers 5 on the various ultrasonic sensor devices are generally different for the front and rear bumpers 4*a*, 4*b* of the motor vehicle 1.

A control unit 6 is provided that serves to evaluate the sensor signals of the ultrasonic transducers 5 of the ultrasonic sensor devices 3*a*, 3*b*. In the control unit 6, a corresponding data-based classification model 61*a*, 61*b* is implemented for each of the ultrasonic sensor devices 3*a*, 3*b*, which classification model is trained separately for the relevant ultrasonic sensor device 3*a*, 3*b*.

The sensor signals are further evaluated in a conventional manner with the aid of ultrasound-based localization methods in order to create a virtual map of the environment in the control unit 6 and to introduce there the positions of detected environment objects U. Classification results are assigned to the detected environment objects U by means of the relevant classification model 61*a*, 61*b*. The classification results classify the environment objects U according to relevant properties for the driving mode of the vehicle. The classification results can indicate, for example, that the relevant environment object U can be traveled over and is collision-relevant.

The data-based classification model assigns a classification vector to an input variable vector comprising signal characteristics from the sensor signals of the ultrasonic transducers. The classification vector comprises an element for each possible class of the classification result. By means of an argmax function, the specific class can be output as a classification result for the model evaluation. The value of the element determined by argmax corresponds here to the classification confidence.

When carrying out certain driving maneuvers, a specific environment object U can be detected successively by the two ultrasonic sensor devices 3*a*, 3*b* when said environment object leaves the detection region of one of the ultrasonic sensor devices 3*a*, 3*b* and enters the detection region of the other ultrasonic sensor devices 3*a*, 3*b*. Because both ultrasonic sensor devices 3*a*, 3*b* carry out a classification by means of the associated classification models 61*a*, 61*b*, two classification results result for the specific environment object U. This is not a problem as long as the classification results are identical. However, if the classification results are different, the most accurate classification result needs to be selected.

Figure 2:
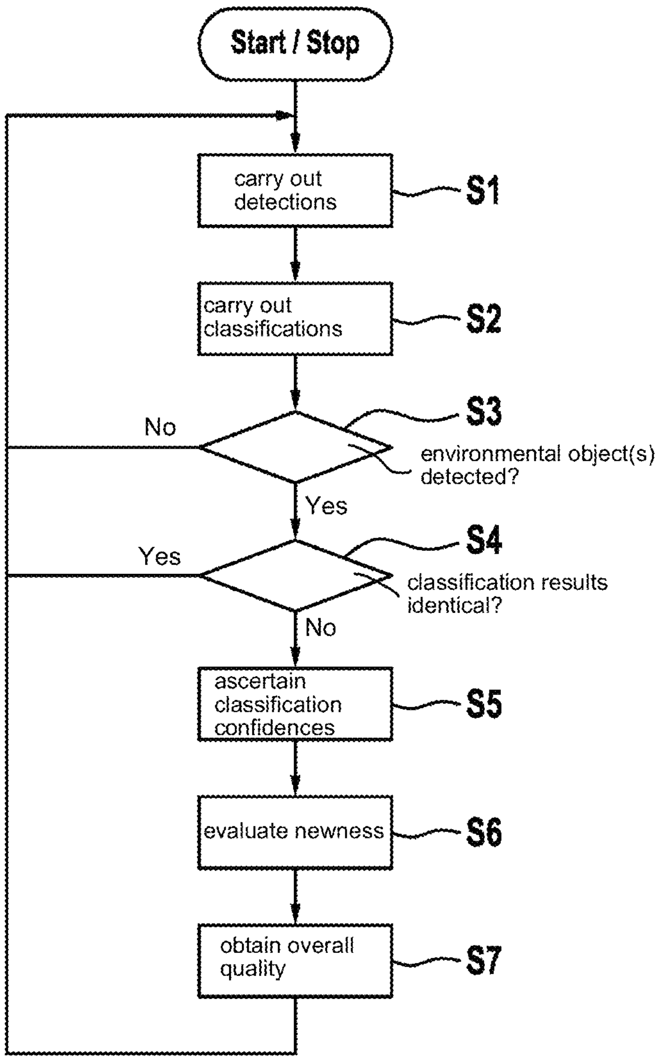
FIG. 2 shows a flow chart for illustrating a method for operating the ultrasonic sensor system of FIG. 1, according to an example embodiment of the present invention.

In this regard, a method is provided in the control unit, which is described in more detail below with reference to the flow chart in FIG. 2.

In step S1, detections are carried out continuously by means of both ultrasonic sensor devices 3*a*, 3*b*. For this purpose, detected environment objects U are localized in a conventional manner as a function of the sensor signals to be evaluated and entered or tracked in an environment map.

In step S2, for each detection of an environment object U, one of the ultrasonic sensor devices 3*a*, 3*b* carries out a classification by means of the assigned classification model 61*a*, 61*b*. The classification leads to corresponding classification results.

In step S3, a check is carried out to determine whether one or more environment objects have been detected in chronological sequence by both ultrasonic sensor devices 3*a*, 3*b*. This can occur particularly during certain driving maneuvers, such as turning maneuvers or the like. If it is determined that a specific environment object U has been detected by both ultrasonic sensor devices (alternative: yes), the method continues with step S4, otherwise (alternative: no), the method returns to step S1.

In step S4, a check is carried out to determine whether the classification results of both classifications are identical to the classification models 61*a*, 61*b*. If this is the case (alternative: yes), the method is continued with step S1. Otherwise (alternative: no), the method is continued with step S5.

In step S5, corresponding classification confidences are ascertained for the classifications. The classification by means of the data-based classification model is carried out by forming argmax over the available classes, wherein the value of the element determined in each case by argmax corresponds to or correlates with the classification confidence, i.e. the reliability of the classification result. The classification confidence can be provided as a classification quality.

In step S6, as a further aspect, the newness of the most recently determined classifications is evaluated. The newness can be determined by a time stamp of the last detection of the relevant environment object by the ultrasonic sensor devices 3*a*, 3*b*. The difference between the particular timestamp and the current point in time can thus be translated into a newness quality according to a predetermined assignment function. The newness is higher the shorter the time period between the particular timestamp and the current point in time.

An overall quality can now be obtained for each of the classification models 3*a*, 3*b* in step S7 as a weighted average of the newness quality and the classification quality for each of the classification models.

In particular, the overall quality sigma_tot of a classification process can be determined by the relevant ultrasonic sensor device 3*a*, 3*b* as a weighted average with the classification quality sigma_class of the relevant classification model and a newness quality sigma_new resulting from a newness of the last ascertained classification result for the relevant environment object U, where:

$$\text{sigma\_tot}=(\text{sigma\_class}*a1+\text{sigma\_new}*a2)/2$$

where a1 and a2 represent additional predeterminable weighting factors.

In step S7, the classification result ascertained by the classification model assigned the highest overall quality is assumed as the classification result. In this way, the resulting classification result is not always automatically adopted whenever a first detection of the relevant environment object U is carried out by one of the ultrasonic sensor devices 3*a*, 3*b* after it has already been detected by another of the ultrasonic sensor devices 3*a*, 3*b*, but the classification quality and the newness are also taken into account.

Depending on the assumed classification result, driving maneuvers can be planned or warnings can be signaled to the driver.

Figure 3:
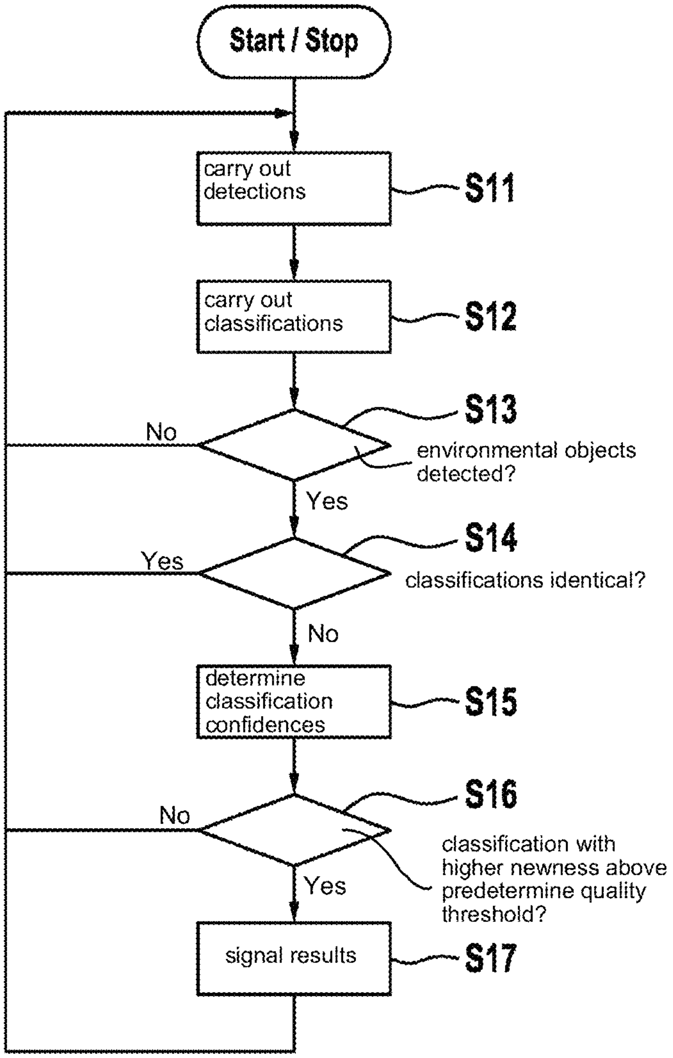
FIG. 3 shows a flow chart for illustrating a further method for operating the ultrasonic sensor system of FIG. 1, according to an example embodiment of the present invention.

According to a further embodiment of the method, which is described in more detail in the flow chart of FIG. 3, the newness of the data can be taken into account to a greater degree.

In step S11, detections are carried out continuously by means of both ultrasonic sensor devices 3*a*, 3*b*. For this purpose, detected environment objects U are localized in a conventional manner as a function of the sensor signals to be evaluated and entered or tracked in an environment map.

In step S12, for each detection of an environment object U, one of the ultrasonic sensor devices 3*a*, 3*b* carries out a classification by means of the assigned classification model 61*a*, 61*b*. The classification leads to corresponding classification results.

In step S13, a check is carried out to determine whether one or more environment objects have been detected in chronological sequence by both ultrasonic sensor devices 3*a*, 3*b*. This can occur particularly during certain driving maneuvers, such as turning maneuvers or the like. If it is determined that a specific environment object U has been detected by both ultrasonic sensor devices (alternative: yes), the method continues with step S14, otherwise (alternative: no), the method returns to step S11.

In step S14, a check is carried out to determine whether the classification results of both classifications are identical to the classification models 61*a*, 61*b*. If this is the case (alternative: yes), the method is continued with step S11. Otherwise (alternative: no), the method is continued with step S15.

In step S15, corresponding classification confidences are determined for the classifications. The classification by means of the data-based classification model is carried out by forming argmax over the available classes, wherein the value of the element determined in each case by argmax corresponds to or correlates with the classification confidence, i.e. the reliability of the classification result. The classification confidence can be provided as a classification quality.

Subsequently, in step S16, a check is carried out to determine whether the classification quality of the classification model whose detection has a higher newness is above a predetermined quality threshold. If this is the case (alternative: yes), the method continues with step S17 and the classification result of the relevant classification model is signaled. Otherwise (alternative: no), the method is continued with step S11.

The classification confidence can also be ascertained based on one or more individual qualities. The individual qualities can comprise a detection quality, a characteristic quality and/or a model quality.

To determine the detection quality, a quotient of the number of correct classifications and the total number of detections is calculated using predetermined validation data sets. This quotient can be assigned to a corresponding value of the detection quality by means of an assignment function, such as a lookup table.

The number of correct classifications is ascertained by evaluating a predetermined database with labeled data. These form validation data sets that assign sensor signals and/or sensor characteristics generated therefrom of known environment objects to a classification (object property: can be driven over, collision-relevant). These validation data sets are used to check how many object detections recognize the classification result of the actual object property and to ascertain a corresponding probability.

Furthermore, the characteristic quality can result from the availability of the signal characteristics used. This characteristic quality evaluates how the different signal characteristics that contribute to ascertaining the classification result for the classification of a specific environment object are available.

Some signal characteristics are not predictable or do not provide added value in certain situations. For example, a quotient between the traveled distance and the measured distance from the object cannot be evaluated if the vehicle has not moved far enough, or the evaluation of reflections from the detection cone at the point of contact between the object and the ground cannot be evaluated in the near range because reflections from ground proximity cannot be detected there due to the sensor aperture angle. Whether a signal characteristic can be evaluated or not depends on geometric or temporal conditions. If a signal characteristic cannot be evaluated, it is marked with an invalid value and ignored by the classification.

Because the quality of signal characteristics often depends on the detection distance and the detection angle and/or on the nature of surfaces (reflectivity), the signal characteristics to be evaluated on which the classification by the relevant classification model is based can be used accordingly to assess the quality of the classification result. For example, the signal characteristic of the amplitude provides a very good differentiation in the near range, i.e. the relevant environment object is very close to the ultrasonic transducer arrangement, while in the far range it has only a low value due to similar vertical detection angles. Furthermore, high and low amplitude values can be a good indicators of object height, while values in the middle range are less meaningful. Thus, the characteristic quality can be specified depending on the relative position of the environment object with respect to the particular ultrasonic sensor device. This can be done by means of a predetermined characteristic assignment function, for example in the form of a lookup table, so that a specific individual characteristic quality can be assigned to each signal characteristic and a detection characteristic assigned to the signal characteristic. The detection characteristic assigned to the signal characteristic can, for example, result from a spatial relationship between the relevant environment object and the ultrasonic transducer that is involved in determining the signal characteristic.

To determine the overall characteristic quality, each individual signal characteristic to be evaluated and the detection conditions, such as the distance to the object to be classified and the detection angle, are taken into account and a corresponding individual characteristic quality is ascertained by means of a suitable assignment function. Furthermore, the individual characteristic qualities are aggregated with respect to the individual signal characteristics to form an overall characteristic quality, in particular by averaging, in particular with a weighted consideration of the individual characteristic qualities with predetermined weightings.

Furthermore, the model quality of the classification model used can be taken into account. This takes into account the general suitability of the ultrasonic sensor devices for the classification of environment objects, so that different model qualities can be assumed based on the relevant sensor configuration, which results from the installation situation of the ultrasonic transducers of the relevant ultrasonic sensor device. The model quality is independent of the environmental situation and only determines the quality of a classification based on the configuration (arrangement and geometric orientation) of the ultrasonic transducers of the relevant ultrasonic sensor device.

An overall quality can now be ascertained using a weighted average of the detection quality, the characteristic quality and the model quality. Alternatively, the overall quality can be determined by a weighted average of the detection quality, the characteristic quality, the model quality and the newness quality.

The invention claimed is:

1. A method for fusion of classification results of a plurality of classification models in order to classify environment objects using a plurality of ultrasonic sensor devices in a mobile device, the method comprising the following steps:

detecting sensor signals of ultrasonic transducers of the plurality of ultrasonic sensor devices including a first ultrasonic sensor device and a second ultrasonic sensor device;

tracking, by each of the plurality of ultrasonic sensor devices, a position of one or more detected environment objects;

classifying, by a first classification model associated with the first ultrasonic sensor device, an object type of the one or more detected environment objects to generate a first classification result;

classifying, by a second classification model associated with the second ultrasonic sensor device, an object type of the one or more detected environment objects to generate a second classification result;

when it is determined that a first environment object of the one or more detected environment objects has entered a detection region of the first ultrasonic sensor device and was previously located in a detection region of the second ultrasonic sensor device and when the first classification result is different than the second classification result, selecting one of the first and second classification results for the first environment object depending on a classification quality associated with each of the first and second classification results and depending on a newness of each of the first and second classification results; and controlling the mobile device based on the selected classification result.

2. The method according to claim 1, wherein selecting one of the first and second classification results includes selecting that classification result whose newness indicates a more recent classification if the corresponding overall quality of that classification result, which is determined based on its associated classification quality and newness, exceeds a predetermined threshold.

3. The method according to claim 1, wherein each newness is assigned to a newness quality using an assignment function, the newness quality indicating a higher quality the shorter a time since an acquisition of the underlying sensor data, wherein an overall quality is determined from the classification quality and the newness quality, wherein the selecting one of the first and second classification results includes selecting that classification result depending on the overall qualities of the corresponding classification results of the first and second classification models.

4. The method according to claim 3, wherein each overall quality for the first and second classification results is determined by weighted averaging of the classification quality and the newness quality.

5. The method according to claim 1, wherein the first and second classification models are data-based, wherein the classification qualities are determined as values of an element of an output vector of the classification models with a highest value.

6. The method according to claim 1, wherein each newness is assigned to a newness quality using an assignment function, the newness quality indicating a higher quality the shorter a time since the acquisition of the underlying sensor data, wherein an overall quality is determined from individual qualities and the newness quality, wherein selecting one of the first and second classification results includes selecting that classification result depending on the overall qualities of the classification results of the first and second classification models.

7. The method according to claim 6, wherein the classification qualities are determined by weighted averaging of the individual qualities, wherein the individual qualities includes at least one of the following: a detection quality, a characteristic quality, and a model quality.

8. The method according to claim 7, wherein the detection quality is ascertained as a function of a quotient of a number of correct classifications of the first environment object and a total number of classifications of the first environment object.

9. The method according to claim 7, wherein the characteristic quality is determined as a function of contributions of signal characteristics resulting from the sensor signals for ascertaining the classification result for the classification of the first environment object and a detection characteristic, including a relative position of the first environment object with respect to the ultrasonic transducer assigned to the signal characteristic.

10. The method according to claim 7, wherein the model quality is determined by the choice of the classification model.

11. The method according to claim 6, wherein the overall qualities are determined by a weighted average of the individual qualities.

12. The method according to claim 6, wherein the overall qualities are determined by a weighted average of the individual qualities and the newness quality.

13. An apparatus configured for fusion of classification results of a plurality of classification models in order to classify environment objects using a plurality of ultrasonic sensor devices in a mobile device, the apparatus comprise at least one processor configured to:

detect sensor signals of ultrasonic transducers of the plurality of ultrasonic sensor devices including a first ultrasonic sensor device and a second ultrasonic sensor device;

track, by each of the plurality of ultrasonic sensor devices, a position of one or more detected environment objects;

classify, by a first classification model associated with the first ultrasonic sensor device, an object type of the one or more detected environment objects to generate a first classification result;

classify, by a second classification model associated with the second ultrasonic sensor device, an object type of the one or more detected environment objects to generate a second classification result;

when it is determined that a first environment object of the one or more detected environment objects has entered a detection region of the first ultrasonic sensor device and was previously located in a detection region of the second ultrasonic sensor device and when the first classification result is different than the second classification result, select one of the first and second classification results for the first environment object depending on a classification quality associated with each of the first and second classification results and depending on a newness of each of the first and second classification results; and control the mobile device based on the selected classification result.

14. A non-transitory machine-readable storage medium on which are stored commands for fusion of classification results of a plurality of classification models in order to classify environment objects using a plurality of ultrasonic sensor devices in a mobile device, the commands, when executed by a computer, causing the computer to perform the following steps:

detecting sensor signals of ultrasonic transducers of the plurality of ultrasonic sensor devices including a first ultrasonic sensor device and a second ultrasonic sensor device;

tracking, by each of the plurality of ultrasonic sensor devices, a position of one or more detected environment objects;

classifying, by a first classification model associated with the first ultrasonic sensor device, an object type of the one or more detected environment objects to generate a first classification result;

classifying, by a second classification model associated with the second ultrasonic sensor device, an object type of the one or more detected environment objects to generate a second classification result;

when it is determined that a first environment object of the one or more detected environment objects has entered a detection region of the first ultrasonic sensor device and was previously located in a detection region of the second ultrasonic sensor device and when the first classification result is different than the second classification result, selecting one of the first and second classification results for the first environment object depending on a classification quality associated with each of the first and second classification results and depending on a newness of each of the first and second classification results; and controlling the mobile device based on the selected classification result.

* * * * *